United States Patent [19]

Rao

[11] 3,907,311

[45] Sept. 23, 1975

[54] HIGH TEMPERATURE, LOW FRICTION CERAMIC COATING FOR GAS TURBINE REGENERATOR SEALS

[75] Inventor: V. Durga Nageswar Rao, Woodhaven, Mich.

[73] Assignee: Ford Motor Company, Dearborn, Mich.

[22] Filed: Apr. 15, 1974

[21] Appl. No.: 461,197

[52] U.S. Cl. ............. 277/96 R; 117/93.1 PF; 165/9
[51] Int. Cl.² .......................................... F16J 15/16
[58] Field of Search ........... 277/96 R, 96 A, DIG. 6, 277/235 A; 165/9; 117/93.1 PF

[56] References Cited
UNITED STATES PATENTS

| | | | |
|---|---|---|---|
| 3,646,993 | 3/1972 | Rice | 277/96 |
| 3,647,228 | 3/1972 | Cassidy | 277/96 |
| 3,659,861 | 5/1972 | Rao | 277/96 |
| 3,743,008 | 7/1973 | Zeek et al. | 165/9 |
| 3,746,352 | 7/1973 | Rao | 277/96 |
| 3,747,944 | 7/1973 | Roy et al. | 277/96 |

*Primary Examiner*—Robert I. Smith
*Attorney, Agent, or Firm*—Donald J. Harrington; Keith L. Zerschling

[57] ABSTRACT

A high temperature seal coating material adapted to be used with a rotary ceramic regenerator matrix to effect a sliding seal of one gas flow region of the regenerator with respect to another, the coating including manganese oxide as one of the constituents to provide improved hardness thereby achieving an increased seal life during operation of the rotary regenerator at high temperatures.

2 Claims, No Drawings

HIGH TEMPERATURE, LOW FRICTION CERAMIC COATING FOR GAS TURBINE REGENERATOR SEALS

GENERAL DESCRIPTION OF THE INVENTION

The improvements of my invention relate generally to coating materials for use with regenerator seals for rotary ceramic regenerator matrixes in a gas turbine engine. Reference may be made to my co-pending application, Ser. No. 415,897, filed Nov. 14, 1973, for a description of a gas turbine engine and seal coating material for use with a seal that forms a part of the gas turbine engine regenerator construction. The coating materials for the seals described in my U.S. Pat. No. 3,746,352 includes zinc oxide, calcium fluoride and stanic oxide although other examples of suitable seal materials under various operating conditions also are described in that patent.

In order to improve the mechanical strength and to avoid chipping of the seal material during operation of the gas turbine regenerator at high temperatures, the zinc oxide and calcium fluoride may be supplemented with stanic oxide. I have described this improvement in my U.S. Pat. No. 3,679,459. Both of my prior patents may be referred to for the purpose of supplementing this disclosure.

Although seal material for gas turbine regenerators that include zinc oxide, calcium fluoride and stanic oxide ($S_nO_2$) have been successful, the addition of stanic oxide greatly increases the cost of the material. My improved sealing material does not require the use of expensive stanic oxide although the desirable properties of that compound are retained. Specifically, manganese oxide is substituted for the stanic oxide, although care must be taken to maintain the proper percentage of manganese oxide in the seal material. I have described this characteristic in the following particular description. The cost of my improved seal material is reduced to about one-half of the cost of seal materials containing stanic oxide.

A seal which uses the coating described in this specification results in increased hardness and improves the thermal cycling properties as well as the mechanical strength of the seal. Crumbling is avoided as temperature changes occur in the gas turbine cycle.

PARTICULAR DESCRIPTION OF THE INVENTION

I have described in my U.S. Pat. No. 3,746,352 a seal material that includes 70% zinc oxide and 30% calcium fluoride. It is suggested in that disclosure that it may be used to seal the so-called crossarm seal portion of a rotary regenerator seal construction. The calcium fluoride provides a glazing surface for the seal and the zinc oxide provides those wear properties that are necessary for adequate seal life and to provide adequate mechanical strength. Stanic oxide is used to improve the hardness of the coating in the high temperature zone of the regenerator seal. This zone, which normally is accompanied by a high wear rate is at the crossarm of the seal that separates the high-temperature, low-pressure region of the regenerator matrix from the high-pressure, low-temperature region. At that point the gas flow passages of the generator matrix pass over the seal with a high temperature rubbing action. Although use of stanic oxide for seal coatings at this location of the seal contruction provides the necessary seal life due to the hardness of the coating, the stanic oxide may be eliminated and replaced with manganese oxide, which may be identified generically as $Mn_xO_y$. Typical molecules are $MnO_2$, $Mn_3O_4$ and $MnO$.

The oxides of manganese are introduced in a mixture of 70% zinc oxide and 30% calcium fluoride and used in the preparation of a plasma spray powder. This powder may be prepared in a manner described in my co-pending application, Ser. No. 415,897, filed Nov. 14, 1973. Reference may be made to that application for a description of a method for applying a plasma spray powder to the seal surface. After this is done, the surface is sintered at a temperature of about 2200°F. The manganese oxide should not be used in excess of 15% by weight or less than 5% by weight when the base composition ingredients are 70% by weight zinc oxide and 30% by weight calcium fluoride. The zinc oxide has a low friction co-efficient, but it is soft. The calcium fluoride, as mentioned previously, provides a glaze surface. The addition of the manganese oxide increases the hardness and improves the thermal cycling properties as well as the mechanical hardness so that the composite material will not crumble during high temperature operation.

If the manganese oxide content exceeds 15%, the salt corrosion resistance of the coating is inadequate to meet the desired operating life of the seal. On the other hand, if the manganese oxide content is reduced to less than 5%, there is no significant improvement in the mechanical strength. The coefficient of friction for a seal coating comprising a base composition of 70% by weight zinc oxide, 30% by weight calcium fluoride and manganese oxide in a percentage by weight between 15% and 5% is less than 0.3. This produces a wear rate of 1.5 mils or less for each 100 hours of operation of the gas turbine engine with which the seal is used.

I have provided in the following table a summary of the coefficients of friction and wear rates for seals having various percentages of manganese oxide when used with a base composition of 70% by weight zinc oxide and 30% by weight calcium fluoride.

| COMPOSITION BASE 70 ZnO-30 CaF$_2$ | 200 Hr. 1400°F-RT TH CYCLING TEST | 1400° F SALT CORROSION TEST | COEFF. OF FRICTION | 1400° F-7 PSI WEAR TEST WEAR IN 200 HOURS MILS | WEAR RATE MILS/100 HRS. |
|---|---|---|---|---|---|
| +3% $Mn_xO_y$ | Poor | Good | 0.15–0.2 | 2.0 | 1.0 |
| +5% $Mn_xO_y$ | Marginal | Good | 0.15–0.2 | 2.2 | 1.1 |
| +10% $Mn_xO_y$ | Good | Good | 0.2–0.22 | 2.0 | 1.0 |
| +15% $Mn_xO_y$ | Good | Satisfactory | 0.2–0.25 | 2.0 | 1.0 |
| +18% $Mn_xO_y$ | Good | Attacked | 0.25–0.35 | 2.5 | 1.25 |
| +20% $Mn_xO_y$ | Good | Poor | 0.2–0.4 | 2.5 | 1.2 |

It will be apparent by inspecting the above tabular data that mechanical strength, as evidenced by the cycling test results, is poor for any manganese oxide percentage less than 5%. On the other hand, the salt corrosion test results are indicated to be very satisfactory for any manganese oxide percentage greater than 15%.

Having thus described a preferred embodiment of my invention, what I claim and desire to secure by U.S. Letters Patent is:

1. A high temperature, low friction ceramic coating for use with a sliding seal surface for a ceramic regenerator core seal in a gas turbine engine whereby the coating material is slidably situated in sealing engagement with the sealing surface of the rotary ceramic matrix, said coating material comprising zinc oxide, calcium fluoride and manganese oxide in the form of a sintered powder deposit which is applied to the aforesaid seal surface, the percentage of manganese oxide being between 5% and 30% by weight.

2. The combination set forth in claim 1 wherein the ratio by weight of the zinc oxide to calcium fluoride is approximately 70 to 30, the zinc oxide and calcium fluoride forming the base ingredients to which the manganese oxide is added.

* * * * *